United States Patent [19]

Doiron et al.

[11] Patent Number: 5,251,004
[45] Date of Patent: Oct. 5, 1993

[54] INTEGRATING SPHERE POWER METER

[75] Inventors: Daniel R. Doiron, Santa Ynez; Paul M. Paspa, Santa Barbara; John B. Dunn, Buellton, all of Calif.

[73] Assignee: PDT Systems, Inc., Goleta, Calif.

[21] Appl. No.: 851,472

[22] Filed: Mar. 13, 1992

[51] Int. Cl.$^5$ .............................................. G01J 1/42
[52] U.S. Cl. .................................... 356/236; 250/228
[58] Field of Search .................. 356/236; 250/228; 606/11, 12, 13

[56] References Cited

U.S. PATENT DOCUMENTS

| | | | |
|---|---|---|---|
| 3,864,037 | 2/1975 | Johnson | 356/418 |
| 4,081,215 | 3/1978 | Penney et al. | 356/407 |
| 4,580,557 | 4/1986 | Hertzmann | 606/12 |
| 4,645,922 | 2/1987 | Welbourn et al. | 356/236 |
| 5,153,426 | 10/1992 | Konrad et al. | 606/11 |

FOREIGN PATENT DOCUMENTS 2832847  2/1980  Fed. Rep. of Germany ........ 606/11

Primary Examiner—Richard A. Rosenberger
Attorney, Agent, or Firm—Michael G. Petit

[57] ABSTRACT

An improved power meter for measuring the energy and wavelength of light emanating from an optical fiber. The meter is an integrating sphere having a source aperture for receiving the tip of an optical fiber and coupling the light from the tip into the sphere's central cavity. The source aperture is modified to include a sterilizable, liquid-fillable insert which mimics the optical environment within tissue. The sphere also has improved baffling and the sensitivity of wavelength verification is improved by means of a rotatable interference filter placed between an exit aperture and a light detector.

2 Claims, 4 Drawing Sheets

INTEGRATING SPHERE POWER METER

BACKGROUND OF THE INVENTION

1. Field of the Invention

The present invention relates to a method and device for measuring laser power emitted by the distal tip of a light conducting catheter and more particularly to an improved integrating sphere for measuring energy radiated either from a point or a diffuse source of light.

2. Prior Art

A number of surgical techniques employing laser radiation have been developed. For example, laser devices have been employed as surgical scalpels. Laser photo-coagulating devices are employed in laparoscopic surgery to effect coagulation during surgery. Laser catheters are inserted into blood vessels for the ablation of atherosclerotic plaque. Such techniques have created a need for medical laser systems having variable wavelength and precise power output levels for performing these various procedures.

Photodynamic therapy (PDT) is a procedure involving photoirradiation of tissues having photosensitive molecules concentrated therein. Very early in the development of clinical photodynamic therapy it was found advantageous to use diffusing type light delivery systems to achieve the delivery of more uniform illumination to a volume of tissue. Use of fibers with diffuser tips gave rise to the problem of how to measure the total light emanating from the diffuser tip. Clearly, techniques using standard flat surface power detectors are inadequate for measuring total power from a diffuser tip. At present, the use of an integrating sphere appears to be the most efficient and accurate method of measuring the power delivered by diffuser tips to surrounding tissue. A number of problems arise through the use of prior art integrating spheres for measuring the power output of a surgical optical fiber:

a. the sterility of the fiber must be maintained while performing the power measurement; and b. the light emitting tip of the fiber should advantageously be placed in a fluid environment while performing the power reading to simulate index matching with tissue; and c. in addition to the foregoing problems with prior art integrating spheres, it is frequently desirable to determine whether the wavelength of the light being measured by the integrating sphere is within a specified band.

In PDT it is particularly necessary to precisely control the amount of laser radiation delivered to biological tissues during the photo-therapeutic procedure. The appropriate amount of radiation to produce a therapeutic effect is known to vary with the amount of photosensitive molecule taken up by the tissue and the irradiation technique employed. In addition, the wavelength of the irradiating light must be carefully controlled. If the power level and wavelength of the illuminating light are carefully controlled, this reduces the number of variables that must be determined to achieve accurate dosimetry.

The difficulty of controlling the amount of laser radiation delivered to tissues is aggravated when various peripheral devices such as fibers of different diameter, having varying optical properties and power requirements are used in the same system. Moreover, the optical properties and power output requirements of a particular optical fiber tip may gradually change due to wear, debris build-up, etc., requiring recalibration.

Hertzman, in U.S. Pat. No. 4,580,557, describes some of the problems associated with monitoring the power output of surgical laser accessories. To overcome these problems Hertzman describes a surgical laser system which includes a laser, interchangeable peripheral output devices, a sensor effective to sense the power output of a particular peripheral device, and a control circuit for calibrating the radiation output of each output device and interlocking the system to prevent use of a peripheral output device before it has been calibrated.

The "calibration pod" or "sensor" described by Hertzman is provided to calibrate the peripheral surgical devices which are selectively attached to the system. The calibration sensor consists of an integrating sphere having a first aperture through which the peripheral surgical device (optical fiber) may be inserted or its output beam directed, and a light sensitive electronic device such as a light sensitive silicon diode located in a wall of the sphere. The inside surface of the sphere is a diffusing surface such as sand-blasted metal, anodized aluminum or magnesium oxide or sulfate as is well known in the art. The use of a planar baffle between the first (source) aperture and the detector to prevent the direct illumination of the detector by the source is also well known in the art. Hertzman reports that at any point on the inner surface of the integrating sphere, the amount of illumination is essentially constant and insensitive to the exact positioning of the peripheral surgical device with respect to the sensor.

As mentioned earlier, in photodynamic therapy, or possibly other medical application of lasers using dispersing type delivery system, it is necessary to be able to measure the total power/energy out of an optical fiber delivery probe which energy is radiated into a very large angle, as for example, by diffuser or dispersion type probes. Standard light power/energy meters for lasers are based on flat surface detectors (thermopiles, diodes) that require the light from the laser to be coupled to the detector with a small angle of incidence. This is generally acceptable when working with the laser beam or the output of a flat polished optical fiber of reasonable numerical aperture, <0.5 N.A. When using delivery systems with diffusing type tips (e.g. cylindrical or spherical) or tapered contact tips (i.e. surgical contact fibers), the light is emitted from the fiber tip in the forward, sideways and backward direction making an accurate measurement of the total output of the delivery system not possible with standard flat surface power/energy meters.

In summary, prior art integrating spheres do not have a source aperture adapted to accommodate an optical fiber tip immersed in a fluid medium to simulate the tissue environment prior to measuring the energy. In addition, prior art integrating spheres have no provision for maintaining sterility of the fiber tip that is the subject of the measurement. Prior art integrating spheres lack the capability of measuring the wavelength of light present in the sphere and have poorly designed light baffles which do not maximize the number of light reflections occurring in the sphere prior to detection. It is desirable to maximize the number of reflections to give the most accurate energy measurement.

SUMMARY OF THE INVENTION

It is an object of this invention to provide an integrating sphere, adapted to receive a surgical optical fiber, enabling precise measurement of the power level of light emitted from the tip of the optical fiber and the verification of the wavelength of such light.

It is another object of this invention to provide an improved light baffle for an integrating sphere, the improved baffle giving better shielding of the detector(s) from possible direct or semidirect illumination by a fiber optic probe and enhancing the overall reflectivity of the inner surface of the sphere.

It is another object of this invention to provide an optically transparent insert tube which fits within the light source aperture of an integrating sphere which insert may be sterilized and into which insert an optical fiber tip is placed. The insert may be filled with an appropriate sterile fluid to more closely approximate the optical environment within the tissue and provide an index of refraction match between the optical fiber wall and the wall of the insert tube.

It is a further object of this invention to provide an insert tube for the source aperture of an integrating sphere which does not channel or focus light from the source when the insert tube is filled with fluid. The use of glass insert tubes having an etched or irregular inner surface eliminates internal reflection problems when measuring a forward-launching fiber optic probe and the insert tube is filled with water. Without such etching, the fluid filled tube may act as a light guide and focus the source onto a portion of the wall of the integrating sphere.

Narrow band-pass interference filters are commonly used to measure the wavelength of the light. It is difficult to accurately tune the wavelength sensing of an optically filtered detector due to the diffuse nature of the light within the integrating sphere and the effects of such diffuse light on the optical characteristics of the filter. Off-normal-axis incidence of light from a source causes the peak wavelength transmitted by the interference filter to shift to shorter wavelengths. This makes it difficult to specify the center wavelength tolerance of the optical filters and causes the (usually symmetric) transmission curve of the filter to be distorted. It is, therefore, a further object of this invention to provide an integrating sphere with improved wavelength-sensing capability.

These and other objects of the invention will become apparent as we turn now to the drawings.

DESCRIPTION OF THE PREFERRED EMBODIMENT

Figure 1:
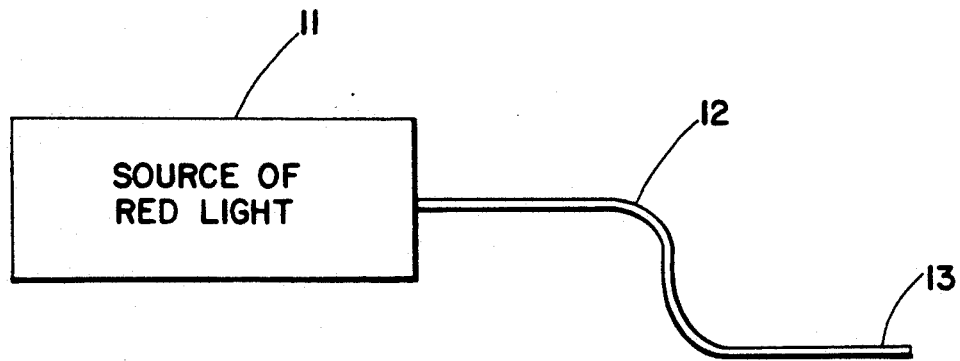
FIG. 1 is a schematic diagram of an optical source and probe useful for PDT.

It is instructive to discuss the improved integrating sphere of this invention in terms of a particular application such as Photodynamic Therapy (PDT). As mentioned earlier Photodynamic Therapy is a procedure involving sensitization of certain tissues by the selective incorporation therein of photosensitive molecules followed by irradiation of the molecules. Such photosensitive molecules, once irradiated, undergo chemical changes resulting in the destruction of the tissue to which they are incorporated. It is well known that red light, or light of longer wavelengths, is more highly penetrating than light of shorter wavelengths in human tissue. For this reason, photo-sensitive molecules that absorb red light and have a particular affinity for target tissues such a tumors have been developed. Such molecules include hematoporphyrin derivatives. In practice, the photosensitive molecules are administered by intravenous injection to the patient approximately 48 hours prior to photodynamic therapy. Following injection the photosensitive molecules are selectively taken up in target tissue such as tumors, where they concentrate. After 48 hours, the body has cleared the residual non-absorbed photosensitizer out of the system. An apparatus for irradiating the target tissue is shown in FIG. 1. An optical fiber 12 with a diffuser tip 13 is inserted into the target tissue (not shown), or in juxtaposition to it, and the photosensitive molecules within the target tissue are illuminated with red light supplied by a suitable source 11. It is important that an accurate dosage of illumination be administered to the target tissue (not shown) to effect a therapeutic response.

Figure 2:
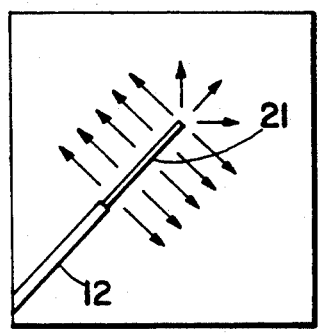
FIG. 2 is a schematic diagram showing a cylindrical diffuser tip on the end of an optical fiber.

Turning now to FIG. 2, we see a prior art tip of an optical fiber useful for PDT. The fiber 12 is terminated in a cylindrical diffuser 21 that radiates or scatters the light laterally outward in a cylindrical pattern.

Figure 3:
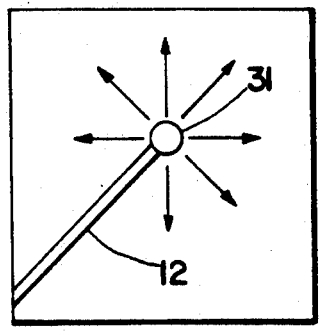
FIG. 3 is a schematic diagram of a spherical diffuser tip on the end of an optical fiber.

FIG. 3 shows yet another diffuser tip affixed to a fiber 12, a spherical diffuser tip 31, which has scattering centers embedded therein which diffuse the incident light from the fiber 12 into a spherical pattern around the tip 31. Accurate measurement of total energy emanating from these diffuser tips is necessary in order to be able to establish dosimetric values for photodynamic therapy.

Figure 4A:
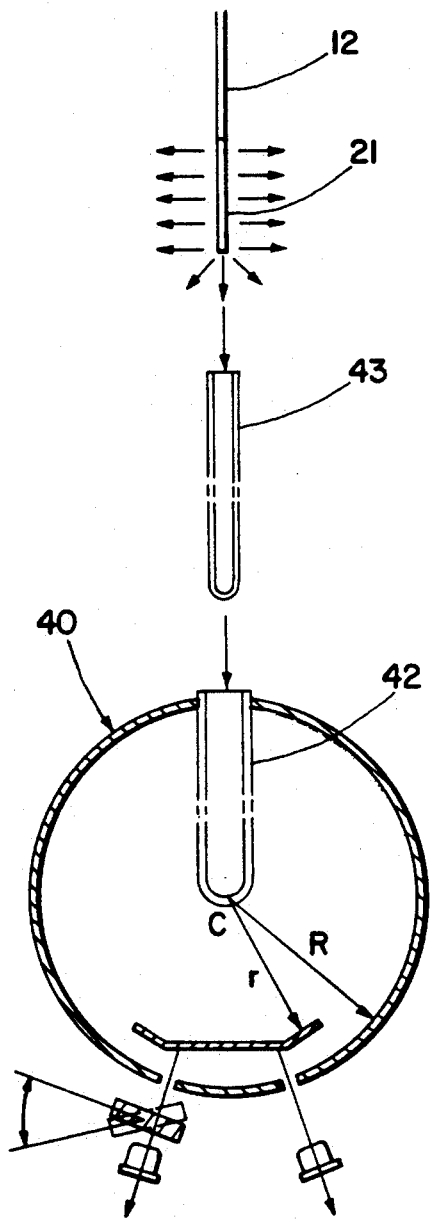
FIG. 4(a) is a telescopic schematic diagram of the components of the optical portion of the improved integrating sphere of the present invention.
Figure 4B:
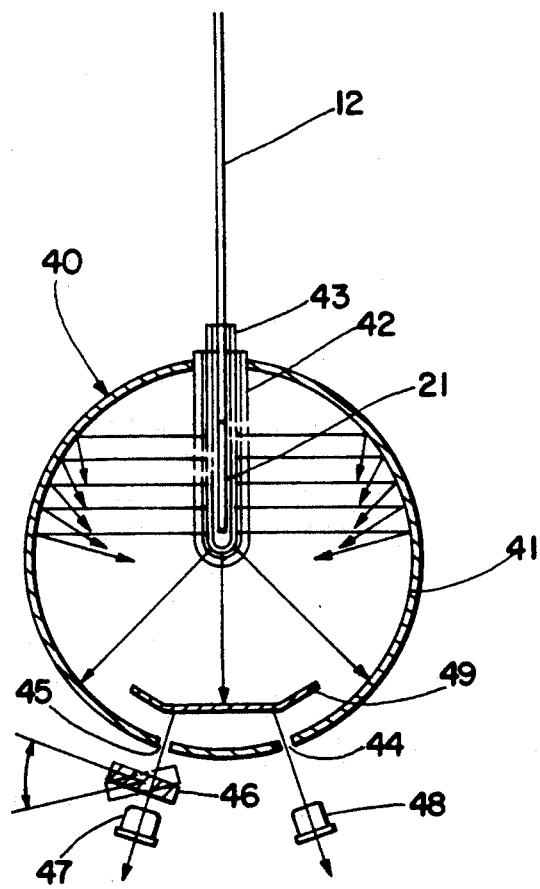
FIG. 4(b) is a schematic diagram of the optical portion of the improved integrating sphere of the present invention with the components in position for use.

An improved integrating sphere suitable for total energy measurements of light emanating from an optical fiber tip, and particularly suitable for diffuser tips of the type shown in FIGS. 2 and 3, is shown in FIG. 4(b). The integrating sphere, generally indicated at 40, has a number of improvements incorporated therein which, although shown in combination, will be discussed individually. The relationship of the light source, source aperture insert and the integrating sphere are sown in FIG. 4(a). The integrating sphere 40 (FIG. 4(b)) comprises a spherical cavity having an inner wall 41 with a surface that is highly reflective. The integrating sphere 40, has a tubular access port or light source aperture, indicated at numeral 42 having an open outer end and a closed inner end protruding inward from the surface of the sphere. Light from a source (not shown) is conducted along the fiber optic 12 to the diffuser tip 21 whence it is radiated outward in the direction of the arrows. Upon encountering the highly reflective inner walls of the sphere, the light scatters or is reflected in all directions, illuminating the entire interior cavity of the sphere. A baffle 49 is provided between the optical fiber tip 21 and the detector aperture 44 to prevent the direct illumination of the detector 48. The light that strikes the walls of the sphere must eventually exit, either through the source aperture 42, through the source aperture insert 43, through the detector aperture 44, or the wavelength sensing aperture 45. The wavelength sensing aperture 45 is a hole cut in the wall of the sphere that has a tiltable filter 46 immediately behind the aperture 45 disposed between the aperture 45 and a detector 47. The filter 46 may be tilted to permit accurate wavelength determination of the illuminating light present within the sphere. The light exiting through aperture 44 is detected directly by the detector 48 which may be a silicone diode. This light source aperture 42 preferably comprises a tubular member, the walls of which may be either clear or etched glass. The source aperture 42 which is dimensioned to receive the tip of an optical fiber is present in some prior art integrating spheres. The source aperture 42 is closed on its inner end to prevent an optical fiber tip 21 inserted therein from exiting the confines of the source aperture 42.

The difficulty with introducing an optical fiber into such a prior art source aperture 42 for power measurements is that an optical fiber tip 21 introduced into such a prior art light source aperture tube 42 can not be maintained in a sterile condition. To overcome this shortcoming a second outer tube 43, hereinafter referred to as a "source aperture insert" or "SA insert", is provided which source aperture insert 43 fits within the source aperture tube 42 and into which source aperture insert a fiber optic tip 21 may be inserted and held in position. The tubular source aperture insert 43 may be inserted into the source aperture 42 and locked in position. Thus, the SA insert 43, which may be sterilized, receives the optical tip 21 and serves the purpose of maintaining sterility in the fiber tip 21 and holding the fiber optic tip in position relative to the geometry of the integrating sphere, particularly the baffle 49.

It is desirable to fill the SA insert tube 43 with a fluid prior to use. The fluid has two functions. The first is to mimic the optical index of refraction of tissue so the delivery fiber will see the same optical environment in situ and in vivo. The second benefit of a fluid-filled SA insert tube is preventing damage to fibers (which depend upon tissue for cooling purposes) when being tested at operating power levels.

Frosting the walls of the source aperture insert tube provides the ability to accurately measure total power delivered using assorted fiber types, with assorted tip distribution patterns (forward focused as well as side diffusing) and improves the overall performance of the device over current unfrosted designs by providing the first line of diffusing within the sphere. The ability to uniformly distribute the incoming light within the sphere is the central to maintaining the accuracy of the meter.

Frosting or etching the walls of the SA insert tube also allows the meter to remain accurate when liquids are used within the SA insert to simulate the optical environment of tissue. The index of refraction of the media surrounding the emitting tip of a light carrying device will have a significant effect on the pattern and power emitted by the device. The ability to fill the SA insert tube 43 with a fluid that is comparable in refractive index to that of tissue provides an optical environment in the integrating sphere similar to the optical environment of tissue. Thus, filling the SA insert with a fluid and inserting the fiber tip therein for measurement will assure that the power delivered by the fiber when embedded in tissue will more closely match the power measured by the integrating sphere.

Figure 5:
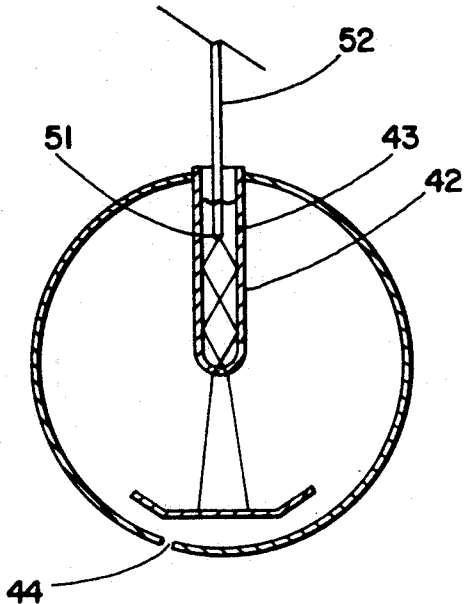
FIG. 5 shows the channeling or focusing light emanating from the tip of an optical fiber when the inner wall of the insert tube is not diffusive.
Figure 6:
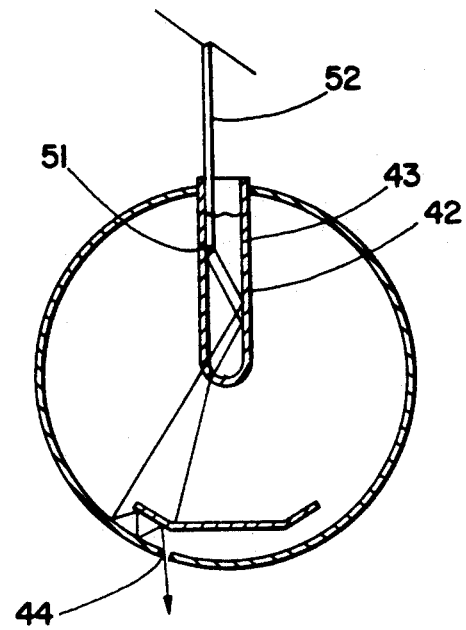
FIG. 6 shows the channeling or focusing light emanating from the tip of an optical fiber when the inner wall of the insert tube is not diffusive and the optical fiber is off center.
Figure 7:
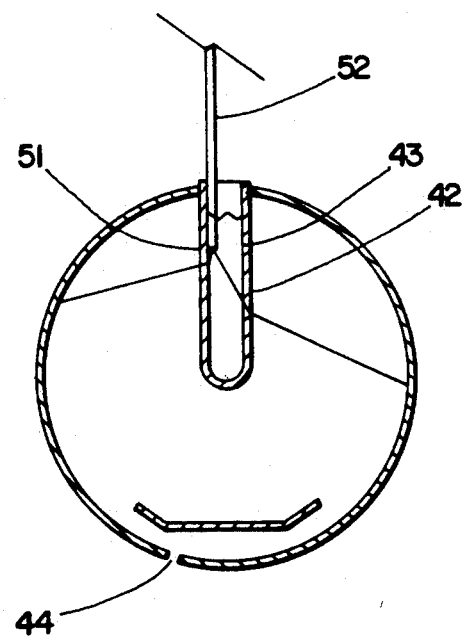
FIG. 7 shows the improved radiation pattern achieved by etching the inner wall of the insert tube.
Figures 8A, 8B, 8C:
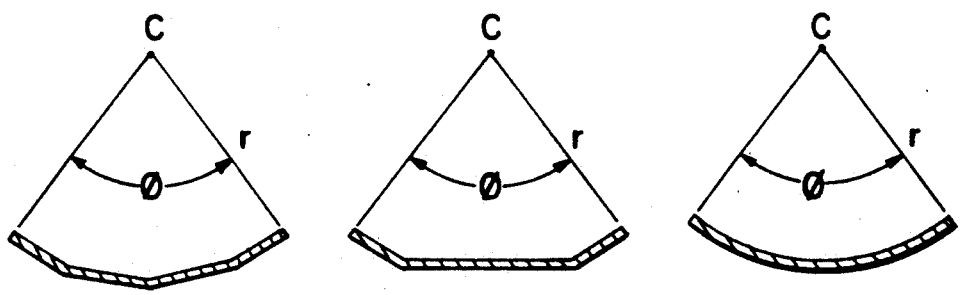
FIG. 8a–c shows several substantially spherical baffles having the same center of curvature as the integrating sphere but a slightly shorter radius of curvature.

Etching the inner walls of the insert 43 prevents the coupling or channeling of light to the tip of the tube. Breaking the water-glass interface prevents internal reflection of the emitted signal which can potentially cause an invalid power measurement when using certain forward projecting types of fiber tips. FIGS. 5 and 6 show the path taken by light emitted from the tip 51 of a fiber 52 into a fluid-filled source aperture insert 43 lacking etched or frosted inner walls. The light is channeled and focused, thereby reducing the number of reflections the emitted light undergoes in the sphere before the light exits the detector aperture 44. FIG. 7 shows the unfocused path taken by the light when the walls of the SA insert 43 and the source aperture tube 42 are frosted.

Frosting has no effect on the ability of the inner tube to be sterilized. Sterility can be maintained by removing the SA insert tube 43 and sterilizing and refilling it with a sterile solution as needed. Frosting the walls of both the SA insert 43 and the source aperture 42 tubes serves to offer improved positional freedom of the fiber tip within the source aperture 42 tube. The positioning of the fiber tip 21 within the SA insert 43 and the SA insert 42 within the source aperture restricts the position of the fiber tip 21 relative to the cavity. This restricted movement within the cavity allows the integrating sphere to have better control of the relative position of the baffle with respect to the input device. This is key to the operation of the spheres ability to be fiber-type independent.

As mentioned earlier, various surgical procedures, as exemplified by PDT, may require light to be delivered through a number of possible distribution patterns. In order to develop a power meter that could accommodate all the possible fiber types required by these various procedures an improved integrating sphere power meter was developed. The goal is to make the meter of the present invention highly accurate and insensitive to the way light is delivered. The use of a fluid-filled source aperture insert tube having etched or frosted walls to receive the optical fiber tip for measurement has been discussed. An improved spherical baffle having a concave inner surface and a convex outer surface which approaches the curvature of the integrating sphere has been developed. Unlike planar prior art baffles, the spherical baffle becomes an integral component of the overall spherical geometry of the interior cavity of the integrating sphere. Like the sphere, which tries to reflect light back to its own center, the improved baffle of the present invention attempts to take on the same function. In performing this function the baffle works like the interior walls of the sphere itself and assists the light delivered to the integrating sphere to stay within the spherical cavity of the sphere longer and go through a greater number of reflections before it is able to escape through an exit aperture. Increasing the number of reflections the trapped light undergoes before exiting the detector aperture has the effect of averaging the fiber output regardless of the initial pattern which light is delivered to the sphere. Thus, the improved spherical baffle allows the integrating sphere to be less sensitive to input as compared to other designs currently available which use a flat baffle, or no baffle at all. The improved baffle allows the user of the device to be more confident in his power readings. The spherical baffle 49 of the present invention is disposed between the detector aperture 44 and the source aperture 42 and comprises a substantially circular member having a concave surface and a convex surface. The radius of curvature of the concave surface is less than the radius of curvature of the spherical cavity. The baffle 49 is mounted within the cavity of the sphere so that the convex surface of the baffle 49 faces the detector aperture 44 and the baffle's center of curvature coincides with the center of curvature of the spherical cavity of the integrating sphere.

Figure 9:
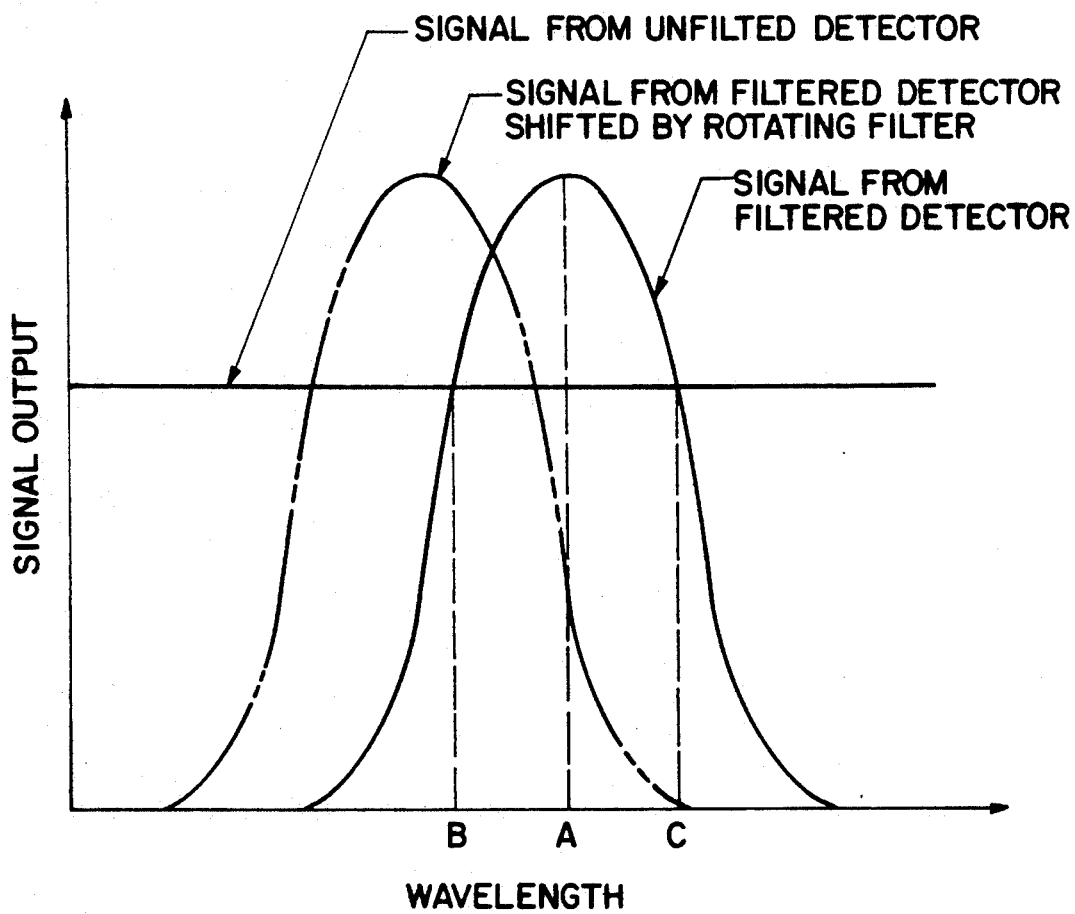
FIG. 9 compares the wavelength sensitivity of the filtered and unfiltered integrating sphere detectors.

The verification of the wavelength of the light entering the sphere is achieved by comparing the filtered and unfiltered signals. The integrating sphere 40 employs a first light sensitive diode 47 behind a narrow pass band interference filter 46 to detect light exiting the meter through the wavelength measuring aperture 45. An unfiltered second light sensitive diode 48 is employed to display overall power present in the integrating sphere regardless of wavelength. The sensitivity of the first and second detectors to changes in the wavelength of light within the integrating sphere is shown in FIG. 9. The signal from the filtered detector is seen to peak at a wavelength corresponding to A and fall off rapidly on both sides, crossing the signal from the unfiltered detector at B and C. By comparing the two signals and setting some minimum ratio between the two signals (for example, FILTERED/UNFILTERED ≧ 1), the meter can verify that the wavelength is within some predetermined band. A circuit (not shown) compares the filtered and unfiltered signals. If the wavelength of the source light is significantly far from the center of the pass band of the filter 46, the signal reaching the filtered diode 47 will likewise be attenuated. When the filtered signal is divided by the unfiltered signal the resulting fraction will be maximum when the light in the sphere is exactly over the center of the tuned filter pass band peak. As the wavelength moves away from central pass band peak to either the longer or shorter wavelengths, the filtered signal will decline respectively because the optical filter will allow less light to reach the diode. Therefore the ratio of filtered unfiltered signal will decrease respectively. When the fraction becomes significantly low (e.g. less than 1) due to the wavelength being significantly far from the tuned central position of the interference filter, a point is reached where the wavelength is no longer verified. The width of the band of verified signal is adjustable, and depends upon the value of the fraction that is preset. Because the signal of both the filtered and unfiltered signal uses the same detection technology, and because the pass band of the filter is power independent, the verification is independent of input power and works over the full range of detection of the meter.

Previous integrating sphere designs which use optical filtering to detect wavelength depended upon the manufacturer of the optical filter to be able to provide filters of sufficient accuracy. Practically speaking, this yielded a high rejection ratio because the clinical needs for the wavelength accuracy significantly exceeded the tolerances provided through the best of commercially available supplied interference filters. In order to overcome this obstacle there is a need to custom tune the interference filter. This is done by using a mount which rigidly positions the wavelength detection diode 47 with respect to the aperture 45 for the filtered channel and allowing the filter to be tuned. Between the detector diode 47 and the aperture 45 an interference filter 46 is mounted. The filter 46 mounting is allowed to rotate about an axis, the direction of the axis lying in a plane parallel to the plane tangent to the surface of the sphere at the aperture 45 but displaced toward the detector 47. Turning the filter with respect to the (usually normally) incident light increases the path length between the layers of the interference filter which, in turn, shifts the filter pass band to the shorter (blue) wavelengths permitting the band pass center of the filter to be adjusted. With this tuning feature a filter with a pass band having a slightly longer central pass wavelength can be tuned into the operating range required by the device by rotating the filter off axis. This tuning capability allows filters to be ordered to the longer wavelength side of the required specification by several nanometers.

In using laser systems it is necessary to use safety goggles to assure that accidental exposure of personnel to the laser light does not occur. In PDT, for example, the laser systems are generally red in color. Commonly, readout devices for integrating spheres are digital and comprise red numerals. This presents a safety problem since power meter displays cannot be easily read with safety goggles in use. To overcome this all the displays associated with detection of red light should be changed to green so that they are visible through the blue laser goggles used to block red laser light.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen to provide the best illustration of the principles of the invention in its practical application to thereby enable one of ordinary skill in the art to utilize the invention in various embodiments and with various modifications as are suited to the particular use contemplated. For example, the tiltable filter could be used behind the exit detector aperture for monitoring wavelengths with or without the baffle in the inner tube. Also, the tiltable filter could be ignored completely in the event that it was not necessary to know the wavelength of the light present inside the integrating sphere. That is, all the improvements could be used either individually or in combination to improve the overall performance of an integrating sphere when measuring the energy out of a diffuser tip. Although etched glass is described as a preferred material for the source aperture insert, any suitable optically transparent material such as plastics capable of being etched or frosted can be used. All such modifications and variations are within the scope of the invention as determined by the appended claims when interpreted in accordance with the breadth to which they are fairly, legally and equitably entitled.

What I claim is:

1. In an integrating sphere power meter for measuring the light energy emitted from a source of light energy, said integrating sphere comprising a substantially spherical cavity having a source aperture in the surface thereof, said source aperture comprising an elongate tubular member projecting radially inward toward the center of said cavity, said source aperture dimensioned to receive said source of light energy, and a detector aperture on the surface of the cavity, the improvement comprising a sterilizable, fluid-filled source aperture insert, said source aperture insert further comprising a substantially tubular housing for said light source, said sterilizable source aperture insert having inner and outer walls, the outer surface of said outer wall being dimensioned to fit snugly within said source aperture and the interior of said sterilizable source aperture insert dimensioned to accommodate said light source.

2. The integrating sphere power meter of claim 1 wherein at least one of the walls of said source aperture insert are frosted.

* * * * *